Figure 1:
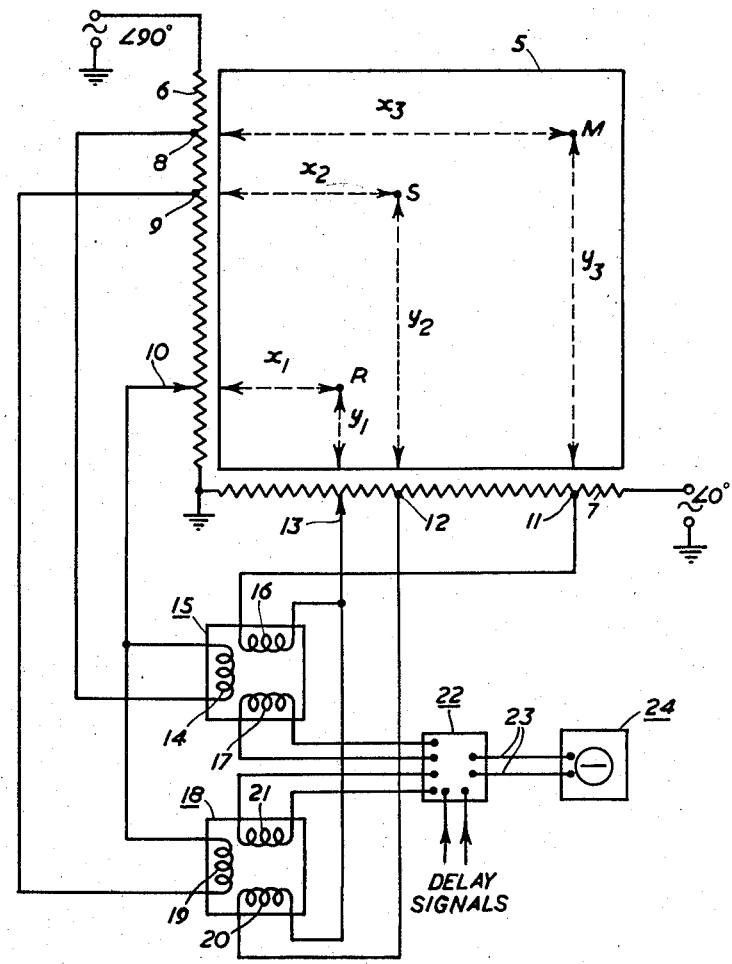

Feb. 16, 1960     J. W. SWIFT     2,924,891
APPARATUS FOR SIMULATING RADIO NAVIGATIONAL AIDS
Filed Oct. 9, 1956     3 Sheets-Sheet 2

INVENTOR
JAMES W. SWIFT

BY Watson, Cole, Grindle
& Watson ATTORNEYS

INVENTOR
JAMES W. SWIFT

2,924,891

APPARATUS FOR SIMULATING RADIO NAVIGATIONAL AIDS

James Walter Swift, Crawley, England, assignor to Communications Patents Limited Application October 9, 1956, Serial No. 614,876

Claims priority, application Great Britain October 18, 1955

3 Claims. (Cl. 35—10.2)

This invention is concerned with the simulation of navigational aids of the type involving the use of timed radio wave transmissions from at least a pair of spaced-apart radio transmitting stations. The radio navigational aids known as Gee, Loran and Decca are examples of the kinds of systems to which the invention relates.

A typical Gee system consists of groups of fixed ground radio transmitters which radiate position fixing pulse signals for airborne or shipborne receivers, the received signals serving to establish a display of information which navigators or pilots can interpret by reference to special charts. Each such group covers a particular area and is made up of three or four pulse transmitters, one of which acts as a master transmitter and serves to synchronise the pulses from the others, which are known as slave transmitters. A receiver situated in the service area will receive signal pulses from the master and one slave transmitter such that the actual delay between the reception of these pulses is dependent upon the difference between the distances travelled by the transmitted pulses and not the actual distances, that is to say, the delay is dependent upon the difference between the transit times of a pulse from the master station directly to the receiver and of a pulse from the master station to the receiver by way of a slave station. Thus each point in the service area can be defined in terms of the signal time delay measured at that point. If a craft carrying a receiver moves in a manner such that this signal time delay is constant, then the craft must be moving along a hyperbolic course. Hence a given time delay corresponds to a particular hyperbolic line of position. A family of confocal hyperbolic lines can be drawn in a suitable colour, for example in red on the chart of the service area, such that each line relates to a particular time delay. These hyperbolic lines can be interpreted as lines of position by observers equipped with suitable receivers, enabling one hyperbolic position co-ordinate as shown on such a chart to be obtained. By means of the reception of signals from the master and another slave transmitter, a second line of position can be identified on another family of hyperbolic curves relating to the two latter transmitters, the resulting lattice formed by the two sets of curves thereby allowing any point on the chart to be defined in terms of the co-ordinates of the two sets. For any given position in the service area, therefore, the measurement of the delay between the reception of pulses from the master transmitter and one slave will identify a particular line of the first set of hyperbolic curves and measurement of the delay between the reception of pulses from the master transmitter and another slave will identify a particular line of the second set, the intersection of these two lines then providing a fix of position. In general, the signals received from the master station are referred to as A pulses and those from the slaves as B, C and D pulses in the case of a four-station group. The A pulses are transmitted at a pulse repetition frequency of twice that of the B and C pulses. The B pulses follow the odd A pulses and the C pulses follow the even A pulses, every fourth A pulse being distinguished by an extra pulse following the normal pulse, thereby enabling the pulses associated with a particular transmitter to be identified when they are displayed on a cathode ray tube utilising a timebase synchronised with the A pulses. Usually every second timebase sweep is displaced vertically downwards so that alternate A pulses appear on separate traces. The time delays of the B and C pulses with respect to the A pulses are measured, each such time delay being representative of a particular hyperbolic line of position. On the chart on which such position lines are drawn, references are provided whereby the lines are numbered in Gee units, where one Gee unit represents a delay of 66⅔ micro-seconds, which in terms of the transit time of the transmitted pulses represents a distance of 12⅔ miles. Each such hyperbolic line of position constitutes a Gee co-ordinate.

An object of the invention is to provide an apparatus which produces an electrical quantity representative of the difference in range between one transmitter and a receiver and another transmitter and said receiver, so that time related signals analogous to those present in respect of an actual navigational aid of the type concerned can be made available for training or other purposes. Thus in the case of an apparatus for simulating a Gee system, it is an object of the invention to produce an electrical quantity which is representative of the difference in range between a master transmitter and a receiver and a slave transmitter and the receiver so that time related electrical pulses can be established on a display screen in a manner analogous to the display exhibited by a Gee display unit.

According to one aspect of the invention an apparatus for simulating a navigational aid of the type involving the use of radio wave transmissions from master and slave transmitters and a receiver responsive to these transmissions comprises means from which there is obtained range signals which are representative of the distance between the master transmitter and the receiver and the distance between the slave transmitter and the receiver respectively, and means serving to produce in response to said range signals an electrical quantity which is representative of the difference in the radio wave transit times between the master transmitter and the receiver and the slave transmitter and the receiver.

According to another aspect of the invention an apparatus for simulating a navigational aid of the type involving the use of radio wave transmissions from master and slave transmitters and a receiver responsive to these transmissions, comprises means for obtaining electric signals representing the position co-ordinates of the master and slave transmitters and of the receiver, means responsive to these electric signals serving to provide range signals which are representative of the distance between the master transmitter and the receiver and the distance between the slave transmitter and the receiver respectively, and means serving to produce in response to said range signals an electrical quantity which is representative of the difference in the radio wave transit times between the master transmitter and the receiver and the slave transmitter and the receiver.

In a further aspect of the invention an apparatus for simulating a navigational aid of the type involving the use of radio transmissions from a master transmitter and a plurality of slave transmitters and a receiver responsive to these transmisions comprises means from which there is obtained a range signal which is representative of the distance between the master transmitter and the receiver and a plurality of range signals each of which is representative of the distance between a different slave transmitter and the receiver, and means serving to produce in response to said range signal and each of said plurality of range signals a plurality of electrical quantities each of which is representative of the difference in the radio wave transit times between the master transmitter and the receiver and a particular slave transmitter and the receiver.

According to a still further aspect of the invention an apparatus for simulating a navigational aid of the type involving the use of radio transmissions from a master transmitter and a plurality of slave transmitters and a receiver responsive to these transmissions, comprises means for obtaining electric signals representative of the position co-ordinates of the master transmitter and a plurality of slave transmitters and of the receiver, means responsive to these electric signals serving to provide a range signal which is representative of the distance between the master transmitter and the receiver and a plurality of range signals each of which is representative of the distance between a different slave transmitter and the receiver, and means serving to produce in response to said range signal and each of said plurality of range signals an electrical quantity which is representative of the difference in the radio wave transit times between the master transmitter and the receiver and a particular slave transmitter and the receiver.

In accordance with a particular feature of the invention the electrical quantity produced in response to said range signals is made representative of the difference in the radio wave transit times between the master transmitter and the receiver and the master transmitter and the receiver by way of a slave transmitter.

According to another feature of the invention there is provided means serving to introduce an electrical signal which is representative of the distance between a master and a slave transmitter, and to use this signal to modify the said electrical quantity so that the latter is representative of the difference in the radio wave transit times between the master transmitter and the receiver and the master transmitter and the receiver by way of a slave.

According to a further feature of the invention there is provided means whereby an electrical signal, which is representative of the time delay imposed by a slave transmitter on signals received from the master transmitter before subsequent retransmission of such signals, serves to modify the said electrical quantity so that the latter is a function of said delay.

According to a still further feature of the invention there is provided means which, in response to the application thereto of the said electrical quantity, establishes a visual display.

In preferred embodiments of the invention there is provided means whereby the electric signals, representing the position co-ordinates of the master, and slave, transmitters, and of the receiver, are made available as alternating voltages of different phase in order to facilitate determination of direction.

Figure 2:
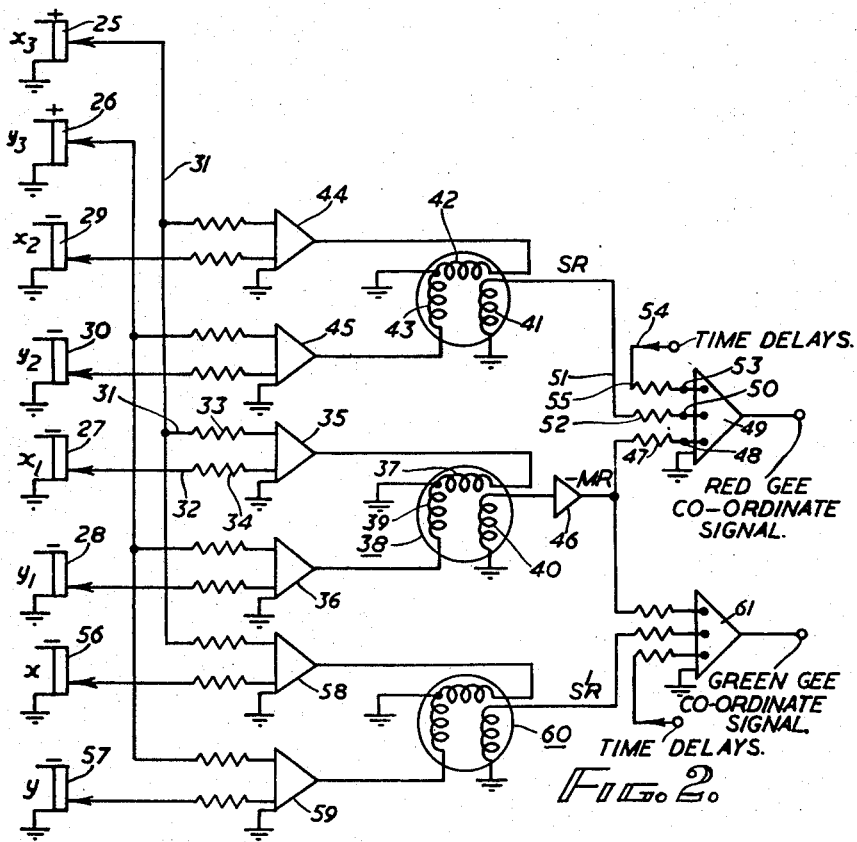
Figure 3:
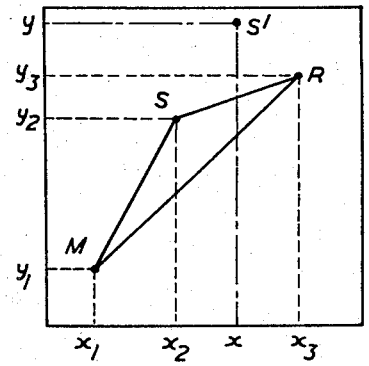
Figure 4:
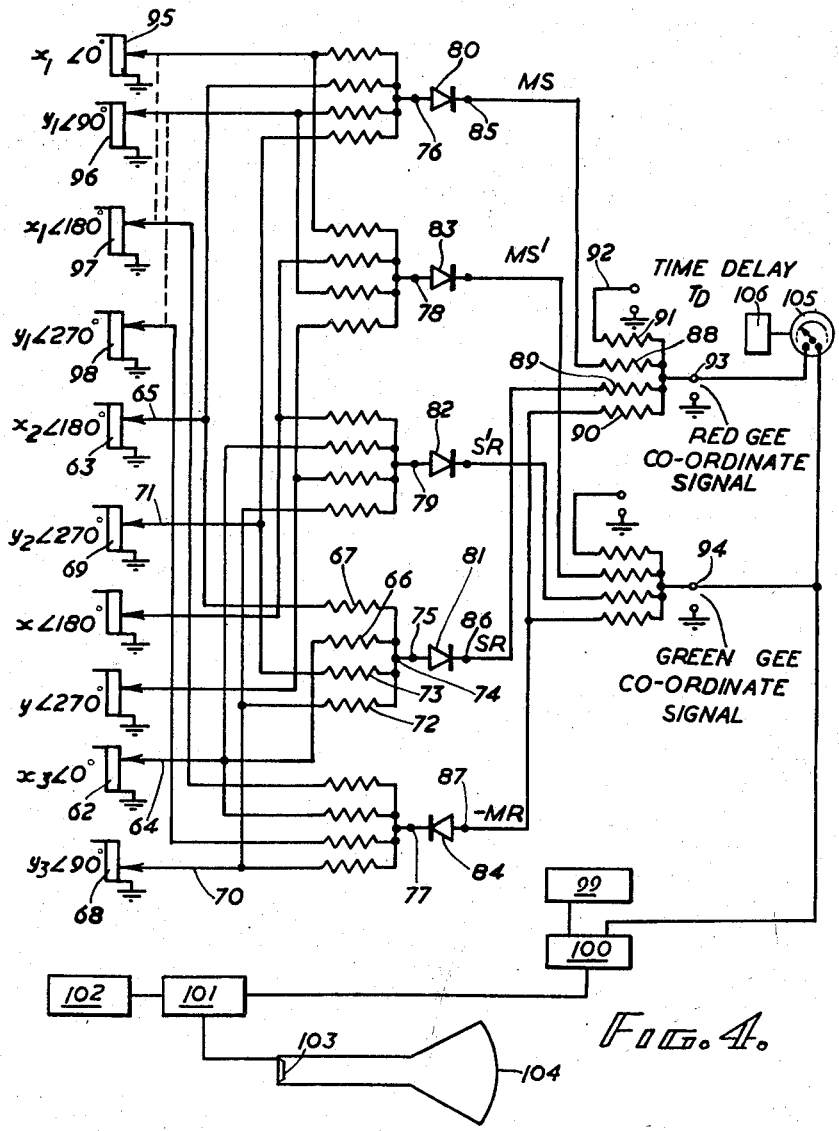

In order that the invention may be better understood three preferred embodiments thereof will now be described, by way of example only, with reference to the accompanying drawings in which:

Fig. 1 shows, in diagrammatic manner, an elementary form of apparatus according to one embodiment of the invention, Fig. 2 shows, in similar manner, an embodiment of the invention which pertains to the simulation of a navigational aid system involving a master and two slave transmitters, Fig. 3 depicts spatial position co-ordinates relative to the operation of the apparatus shown in Fig. 2 and Fig. 4 shows, in diagrammatic manner, another form of apparatus according to the invention.

The apparatus shown in Fig. 1 involves the use of a chart 5 of the area in which the navigational aid system to be simulated is assumed to provide its service and, in this elementary example, this system comprises two radio transmitters namely a fixed master transmitter and a fixed slave transmitter which are assumed to be located at the positions M and S respectively in the area. R indicates the prevailing position of an appropriate radio receiving equipment which is being carried by a craft, for example in an aircraft, which is assumed to be moving in the service area. Thus, in order to simulate the presence of the position fixing pulses which such a system would make available at the receiver, it is proposed, in accordance with a feature of this invention, to produce an electrical quantity which is a function of the difference in the transit times of radio waves between the master transmitter at M and the receiver at R and between the master transmitter at M and the receiver at R by way of the slave transmitter at S. Such an electrical quantity can then be utilised, directly or otherwise, to control a cathode ray tube or other means of presenting timed pulse information, so that this presentation is analogous with that of a real Gee or similar system. The manner in which this objective is obtained will now be described.

Linear potentiometers 6 and 7 are arranged alongside the chart 5 in directions corresponding to the north-south and east-west orientations respectively. The potentiometer 6, which pertains to Y co-ordinates, has preset tapping points 8 and 9 and a movable wiper 10, while the potentiometer 7, which pertains to X co-ordinates, is provided with preset tapping points 11 and 12 and a movable wiper 13. The wipers 10 and 13 pertain to the position co-ordinates of R and, as the latter is the prevailing position of the craft, it is convenient to arrange for the movement of these wipers to be made in accordance with the movement of a track indicating or recording unit (not shown) which is provided in association with the chart 5. For example, the movement of the unit can be arranged to take place in response to the operation of flight controls in a flight training apparatus and, as such units are so well-known in the art, it is thought to be unnecessary to show it in the drawing or to include any further description thereof.

The potentiometers 6 and 7 are energised from an alternating current supply and, for reasons hereinafter to be mentioned, it is advantageous if the voltages across these two potentiometers are phase displaced, for example by imposing quadrature voltages of phase relationship $\angle 0°$ and $\angle 90°$ respectively across them, as indicated on the drawing.

It will be seen that the voltages available between the wiper 10 and earth and the wiper 13 and earth are representative of the co-ordinates $y_1$ and $x_1$ respectively of the position R. Likewise the voltages between the tapping 9 and earth and the tapping 12 and earth are representative of the co-ordinates $y_2$ and $x_2$ respectively of the position S. Similarly, from the tappings 8 and 11 there are made available voltages which are representative of the co-ordinates $y_3$ and $x_3$ respectively of the position M. Consequently, the magnitude of the signal available between tapping 8 and wiper 10 will be representative of the distance $y_3-y_1$, that is to say the distance between the receiver located at R and the master transmitter located at M along the Y axis. Also, the magnitude of the signal available between the tapping 11 and the wiper 13 will be representative of the distance $x_3-x_1$, that is of the distance between the receiver at R and the master transmitter at M along the X axis. The signal voltage between the tapping point 8 and the wiper 10 is applied to one stator winding 14 of a resolver 15 and the signal voltage between the tapping point 11 and the wiper 13 is applied to a second stator winding 16 of this resolver, with the result that there is obtained from an output winding 17 on the rotor of this resolver a signal which constitutes a range signal and has a magnitude representative of the distance MR, namely the vector resultant of the aforesaid signals representative of $y_3-y_1$ and $x_3-x_1$.

A further resolver, indicated at 18, has applied to a stator winding thereof the signal voltage appearing between the tapping point 9 and the wiper 10, while to a further stator winding 20 of this resolver there is applied the signal voltage appearing between the tapping point 12 and the wiper 13, so that there is obtained from the rotor winding 21 of this resolver an alternating signal representing a further range signal, the magnitude of which is representative of the distance SR, namely the vector resultant of the alternating signals representative of $y_2-y_1$ and $x_2-x_1$.

The two range signals obtained from the resolvers could, if desired, be used to provide information directly on a suitable indicator, for example, for the purpose of simulating a Decca navigation system. However, in the case of a Gee or similar system, it will be seen that when the craft carrying the receiver is at the position R in the service area it would receive a first pulse signal directly from the master transmitter positioned at M and a second pulse signal which arrives from the master transmitter at M via the slave transmitter at S. It is the difference in transit time between these two pulse signals which is significant to the observer operating the receiver at R. As the apparatus shown in Fig. 1 will provide range information in respect of the distances M to R and S to R and since the distance separating the two transmitting stations at M and S is fixed, it will be seen that it is only necessary to add to this range information a fixed transit time delay which is representative of the distance M to S to obtain a signal which is representative of that which is received at R from M via S. In addition, signals representative of other time delays can also be added, for example those occurring in an actual system for the purpose of identifying master or slave transmitters.

To obtain an electrical quantity which is a function of the difference in the transit time between the master transmitter at M and the receiver at R and between the master transmitter at M and the receiver at R by way of the slave transmitter at S, the electrical outputs from the rotor windings 17 and 21 of the resolvers 15 and 18 respectively are applied to any desired suitable means, for example a summing amplifier indicated at 22, for obtaining the difference between these signals. This amplifier also can be supplied with the required delay signals by way of the input conductors marked "Delay signals."

The electrical output from the summing amplifier 22 appears between conductors 23 and is representative of one Gee co-ordinate, and this output may be used, in conjunction with a suitable time base, to establish a Gee type presentation on a cathode ray tube. In the drawing the conductors 23 are shown conveying this output signal to a cathode ray tube display unit 24.

It is of course to be understood that the apparatus described with reference to Fig. 1 represents a basic and simplified approach to the simulation of a navigational aid of the type to which the invention relates and that this elementary arrangement can be extended in order to simulate realistically the more advanced forms of such aids as are to be found in practice. For example by extending an apparatus of the kind shown in Fig. 1 to include means for representing more than one slave transmitter, namely by providing appropriate potentiometer means and resolvers for the additional transmitter or transmitters in the manner similar to that described with reference to Fig. 1, electrical quantities representing those pertaining to second or third Gee co-ordinates can be obtained. Furthermore the elementary arrangement shown at Fig. 1 can be extended by providing means whereby the position of the master and/or slave transmitter in the area can be changed either manually or automatically. If manual operation is sufficient then it is only necessary to replace the fixed tappings such as 8, 9, 11 and 12 by adjustable tapping means which can be operated by personal intervention. Such adjustment of the position of transmitting stations can be useful when the apparatus is being used to train a pupil navigator in the art of passing from one navigational aid group to another such group, or possibly when the simulation of mobile transmitters is to be effected.

A more advanced form of apparatus according to the invention will now be described, with reference to Fig. 2. The operation of that part of the apparatus whereby one Gee co-ordinate signal only is derived will be explained in detail, as the production of a second or further Gee co-ordinate signals is achieved in a similar manner.

Alternating signals representative of the $x$, $y$ position co-ordinates of a receiver are derived from the wipers of potentiometers 25 and 26 respectively, in a manner similar to that described with respect to the first embodiment, while alternating signals representative of the reversed $x$, $y$ position co-ordinates of a master and one slave transmitter are derived from the wipers of pairs of potentiometers 27—28 and 29—30 respectively, the respective co-ordinates being shown in Fig. 3. This signal reversal is obtained by feeding potentiometer 25 from a reference phase source at $\angle 0°$, while voltages of phase $\angle 90°$, $\angle 180°$ and $\angle 270°$ are impressed across potentiometers 26, 27 and 28 respectively. Signals from the wipers of potentiometers 25 and 27, representative of the co-ordinates $x_3$ and $x_1$ reversed, are applied via conductors 31 and 32 and resistors 33 and 34 respectively to the input terminals of a summing amplifier 35 and as the input to this summing amplifier is representative of $x_3$ minus $x_1$, the output from it will be representative of the distance denoted by $x_3-x_1$ (Fig. 3). Signals representative of the co-ordinates $y_3$ and of $y_1$ reversed are also obtained and applied in a similar manner to a second summing amplifier 36, the output of this amplifier being representative of the distance denoted by $y_3-y_1$. The output from the summing amplifier 35 is applied to a first stator winding 37 of a resolver 38, while the output from the summing amplifier 36 is applied to a second stator winding 39 of this resolver, the output from the rotor winding 40 of this resolver being the vector resultant of the signals on the windings 37 and 39 i.e. the vector resultant of the signals representative of $y_3-y_1$ and $x_3-x_1$, so that this output is a range signal representative of the distance MR.

In a similar manner the output from the rotor winding 41 of a further resolver is a voltage which is representative of the distance SR, the stator windings 42 and 43 of this resolver being supplied, from summing amplifiers 44 and 45, with voltages representative of the distances $x_3-x_2$ and $y_3-y_2$ respectively. The $x_2$ signal voltage is derived from the wiper of potentiometer 29, the $y_2$ signal voltage from the wiper of potentiometer 30 and the signals representative of $x_3$ and $y_3$ are obtained from the wipers of potentiometers 25 and 26 respectively.

The range signal representative of MR as available from the rotor winding 40 is applied to a reversing amplifier 46 which produces an output signal representative of minus MR this output being applied, via a summing resistor 47, to one input terminal 48 of a summing amplifier 49. The range signal representative of SR, as available from the rotor winding 41, is applied to a second input terminal 50 of this summing amplifier via a conductor 51 and a summing resistor 52.

Since a slave transmitter in an actual Gee scheme is, in general, arranged to impose a predetermined time delay on all signals received from a master transmitter, before retransmitting these signals, means are provided to simulate this fixed time delay and also the fixed delay due to the transit time of a pulse between the master and slave transmitters. In this embodiment, this simulation delay is effected by introducing, by way of a third terminal 53 of the summing amplifier 49, a signal representative of such fixed time delays, denoted herein as $T_D$ and MS, this signal being applied via conductor 54 and resistor 55 from any desired suitable source. The time delay imposed at the slave transmitter is denoted herein as $T_D$, while the time delay between the master and slave transmitters is denoted as MS, hence the effective input to the summing amplifier 49 comprises signals representative of MS, SR, minus MR and $T_D$ so that the amplifier output will be representative of $MS+SR+T_D-MR$. Since, in an actual Gee scheme a distance is directly related to a time delay, signals representative of distances, when referred to herein, can readily be interpreted as representative of time delays, it being necessary only to operate on signals representing distances by the appropriate conversion factor, namely that a distance of one mile corresponds to a time delay of approximately 5 microseconds. Hence the output from the summing amplifier 49 will be representative of the difference between the transit times to the receiver of a pulse received from the master transmitter by way of a slave transmitter, and a corresponding pulse received from the master transmitter directly, so that this output is therefore representative of a Gee co-ordinate, for example a red co-ordinate. To provide a visual display of the time delays further means are required, and these will be described hereinafter.

The process whereby another Gee co-ordinate signal, for example a green one, is derived, is similar to that described for the production of the red co-ordinate signal. In this instance summing amplifiers 58 and 59, resolver 60 and a summing amplifier 61 are utilised, these elements being responsive to co-ordinate signals, representing the $x$, $y$ position co-ordinates of a further slave transmitter located at S' (Fig. 3), which are available from the wipers of potentiometers 56 and 57, in conjunction with the signals representing the position co-ordinates of the receiver at R derived from the wipers of potentiometers 25 and 26. By incorporating additional appropriate elements simulation of a system involving further transmitters can be effected as desired.

A further embodiment of the invention incorporating certain additional and advantageous features will now be described with reference to Fig. 4. To simplify the explanation the process for obtaining the red Gee co-ordinate only will be described, that for obtaining the other co-ordinates being generally similar except that it utilises information relevant to the particular elements associated with the producton of these other co-ordinates. In this embodiment the electric signals representing X and Y co-ordinates are distinguished by the phase relationship of such signals, advantageously pairs of related X and Y co-ordinate signals being arranged to be in quadrature phase. The arrangement for the production of two Gee co-ordinate signals includes in this instance, five pairs of potentiometers from the wipers of which are derived signal voltages representing the position co-ordinates of the transmitters and of the receiver. From the wiper of potentiometer 62 is obtained an alternating electric signal representing the co-ordinate $x_3$ (Fig. 3), for convenience this signal being taken as of reference phase ($\angle 0°$), while from the wiper of potentiometer 63 is derived a further signal representing the co-ordinate $x_2$, this signal being anti-phase ($\angle 180°$) with respect to the $x_1$ signal. These two alternating signals are then fed via conductors 64 and 65 to resistors 66 and 67 respectively. From the wipers of potentiometers 68 and 69 are derived further alternating signals of the form $y_3 \angle 90°$ and $y_2 \angle 270°$, these being applied via conductors 70 and 71 to resistors 72 and 73 respectively, the four resistors 66, 67, 72 and 73 being connected to a common point 74. The input signals to these resistors are thus of the form $x_3$, $x_2 \angle 180°$, $y_1 \angle 90°$ and $y_2 \angle 270°$. Expressing these four input signals as trigonometrical relationships and noting that the output signal at the common point 74 will be the sum of these signals where Q denotes this sum, Then $Q \alpha x_3 \sin wt - x_2 \sin wt + y_3 \cos wt - y_2 \cos wt$ $$\therefore Q\alpha(x_3-x_2)\sin wt + (y_3-y_2)\cos wt \quad (1)$$

Where $wt$ is the angular frequency of the supply. This expression can be written as $$Q \alpha P \sin(wt+A) \quad (2)$$

Where $$P=\sqrt{(x_3-x_2)^2+(y_3-y_2)^2} \quad (3)$$

and $$A=\tan^{-1}\frac{y_3-y_2}{x_3-x_2} \quad (4)$$

in accordance with a well known trigonometrical relationship.

It will be seen by reference to Fig. 3 that the magnitude of this range signal represents the distance SR and this signal will be made available at the terminal 75. By a similar process range signals representative of MS and MR are derived, additional information concerning MS' and RS' also being made available, as indicated in Fig. 4, but it is not proposed to describe the derivation of each of these signals in detail as the method employed has been dealt with in relation to the signals representing SR. Range signals representing the distances MS, MR, MS' and S'R will be made available at terminals 76, 77, 78 and 79 respectively, SR, MS and MR relating to the positions of the receiver, master and one slave transmitter, and MR, MS' and S'R relating to the positions of the receiver, master and a second slave transmitter assumed to be located at S'. It is required to add the magnitudes of these signals algebraically, but since they will, in general, bear different phase relationships, that is the value of A given by Equation 4 will in general be different for each such signal, it is necessary firstly to rectify them, for which purpose rectifiers 80, 81, 82, 83 and 84 are provided. Furthermore, since the distance MR is used in a subtractive sense it is necessary to reverse the sign of the signal concerned, this being achieved by connecting the rectifier 84 in a reverse sense.

To obtain a signal representative of one Gee co-ordinate, for example the red co-ordinate, a signal representative of $MS+SR+T_D-MR$ is required, as outlined hereinbefore. Signals representing MS, SR and minus MR are available from terminals 85, 86 and 87 of the rectifiers 80, 81 and 84, these signals being applied to resistors 88, 89 and 90 respectively. A D.C. signal representing the fixed time delay $T_D$ is fed to a resistor 91, via conductor 92 a value being assigned to this signal initially. The resistors 88, 89 and 90 are connected to a common terminal point 93 and hence the signal appearing at this terminal will represent $$MS+SR+T_D-MR$$

and this electrical quantity is representative of the red Gee co-ordinate. An electrical quantity representative of a green Gee co-ordinate will be produced at terminal 94, by a process similar to that described with reference to the production of the red Gee co-ordinate.

It is preferred to derive two sets of co-ordinate signals representing the position of the master transmitter, the first set being of phase $\angle 0°$ and $\angle 90°$, and the second set of phase $\angle 180°$ and $\angle 270°$. These signals are derived from the wipers of potentiometers 95, 96, 97 and 98 respectively, the wipers of potentiometers 95 and 97 being ganged together as also are those of potentiometers 96 and 98. The outputs from these wipers provide signals of the requisite phase for use in conjunction with signals representing the position co-ordinates of the receiver and slave stations, in a manner similar to that described with reference to the production of the red Gee co-ordinate.

The electrical quantities the magnitudes of which represent transit time differences, as described herein, can be utilised to provide a visual display on the screen of a cathode ray tube in which time delays proportional to such transit time differences are represented. To obtain a display analogous to that presented by the receiving equipment of a Gee system, each signal, the magnitude of which represents a red or a green Gee co-ordinate, is compared with the output signal from a suitable timebase 99 which produces a sawtooth output voltage. The green Gee co-ordinate signal available at the terminal 94 is shown applied to a comparator circuit 100 and when the magnitude of the signal from this timebase becomes equal to the magnitude of the signal representing this co-ordinate, a gating circuit 101 is opened, the time delay elapsing before this occurs being proportional to the magnitude of the particular Gee co-ordinate signal. A pulse, from a suitable pulse generator 102 is then applied by way of the gating circuit 101 to the cathode brightness modulating circuit 103 of a cathode ray tube 104, to establish the desired display. In this way a signal magnitude is translated into terms of a time delay, and a visual indication of such delay, analogous to that available in an actual Gee receiver, is provided.

As a pupil, operating for example a flight simulator with which the simulated navigational aid is associated, comes within range of the simulated effects of a further group of transmitting stations, and desires to receive signals representative of such further groups, means can be provided to effect automatic repositioning of the tappings or wipers of the relevant potentiometers to provide signals representing the position co-ordinates of the transmitters associated with this group. For example an electromagnetic relay which is under the control of the pupil can be used to effect a change-over from one set of such tappings to another set or to effect the required repositioning of the wipers. Alternatively this procedure can be made automatic, when the assumed movement of the aircraft takes it outside the service area of a first group of transmitters, so that signals representative of a second group of transmitters will be made available. Should a pupil's assumed movement carry the aircraft completely beyond the range of the service area of the particular navigational aid the signals representing such an aid can be arranged to cease, for example by limiting the distance of travel of the wipers responsible for the production of the receiver co-ordinate signals, so that when such co-ordinate signals reach a certain value, related to the range of a particular transmitter, a wiper ceases to make electrical contact. The simulated navigational aid system can thereby be rendered effectively inoperative at subsequently the same range as the actual navigation aid system would cease to be effective.

To enable the apparatus to produce signals representative of those occurring with respect to the Decca system of navigation, the output signals which are available at terminals 93 and 94 (Fig. 4) can be utilised to provide representations of phase difference, for example by application to a suitably calibrated moving coil meter 105 arranged so that an indicator thereon rotates in accordance with the change of such output signals, thereby simulating the phase changes as encountered in an actual system. In addition by integrating the complete revolutions made by the indicator associated with such an instrument, a particular lane in which a craft is assumed to be situated can be identified, a suitable mechanical gear indicator being denoted at 106.

In a practical navigational aid system in which long distances are involved considerations of spherical trigonometry can arise. For example with a hyperbolic system of the type described herein, the hyperbolae intersect with the substantially spherical surface of the earth. Correction for the effects due to the earth's curvature can be produced in the apparatus herein described, for example by providing the potentiometers from which the co-ordinate signals are derived with windings which are wound non-linearly, so as to enable signals to be derived therefrom which are related to the mathematical equations which arise when effects of the earth's curvature are considered.

It is envisaged that correction for errors due to the altitude of an aircraft can also be simulated, for example by introducing a potentiometer controlled in accordance with the assumed altitude of an aircraft so as to modify the appropriate range signals.

What I claim is:

1. Apparatus for simulating a navigational aid of the type involving the use of radio wave transmissions from master and slave transmitters and a receiver responsive to these transmissions, comprising means for obtaining electric signals representing the assumed position coordinates with respect to a datum position of master and slave transmitters, means for obtaining electric signals representative of the assumed position coordinates with respect to said datum position of a receiver, computing means responsive to these electric signals serving to produce synthetic range signals which are representative of the assumed distance between the master transmitter and the receiver and the assumed distance between the slave transmitter and the receiver, respectively, means serving to produce in response to said synthetic range signals an electrical quantity which is directly proportional to the difference in the asumed radio wave transit times between said master transmitter and the receiver and said slave transmitter and the receiver, a timebase source, a gating circuit responsive to the signal from said timebase source and also to said electrical quantity, a cathode ray display tube, and a pulse generator serving to apply a brightening pulse to this cathode ray tube when the amplitude of said electrical quantity is substantially equal to the amplitude of the signal from the time base source whereby there is obtained a visual indication which is representative of such transit time difference.

2. Apparatus according to claim 1 comprising means for providing an electric signal representative of the time delay imposed by an actual slave transmitter on signals received from an actual master transmitter before subsequent retransmission of such signals, and means responsive to said electric signal adapted to modify said electrical quantity so that the latter is a function of said delay.

3. Apparatus as claimed in claim 1 wherein the electric signals which represent assumed position coordinates of master and slave transmitters and of the receiver are constituted by alternating electric signals of different phase, in order to facilitate distinction of said coordinates.

References Cited in the file of this patent

UNITED STATES PATENTS

| | | |
|---|---|---|
| 2,496,674 | Omberg | Feb. 7, 1950 |
| 2,560,527 | Dehmel | July 10, 1951 |
| 2,569,328 | Omberg | Sept. 25, 1951 |
| 2,730,815 | Gallo | Jan. 17, 1956 |